US010641205B2

United States Patent
Ribarov et al.

(10) Patent No.: US 10,641,205 B2
(45) Date of Patent: *May 5, 2020

(54) EXHAUST STREAM MIXER

(71) Applicant: United Technologies Corporation, Farmington, CT (US)

(72) Inventors: Lubomir A. Ribarov, West Hartford, CT (US); James S. Elder, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 121 days.

This patent is subject to a terminal disclaimer.

(21) Appl. No.: 15/906,201

(22) Filed: Feb. 27, 2018

(65) Prior Publication Data

US 2018/0187629 A1 Jul. 5, 2018

Related U.S. Application Data

(62) Division of application No. 14/298,331, filed on Jun. 6, 2014, now Pat. No. 9,970,386.

(60) Provisional application No. 61/832,198, filed on Jun. 7, 2013.

(51) Int. Cl.
F02K 1/48 (2006.01)
F02K 1/38 (2006.01)
B64D 27/00 (2006.01)
F02K 3/062 (2006.01)
B64D 33/04 (2006.01)

(52) U.S. Cl.
CPC .............. F02K 1/48 (2013.01); F02K 1/386 (2013.01); B64D 33/04 (2013.01); B64D 2027/005 (2013.01); F02K 3/062 (2013.01); F05D 2240/127 (2013.01); F05D 2260/2212 (2013.01); Y02T 50/672 (2013.01)

(58) Field of Classification Search
CPC ...... B64D 2027/005; F02K 1/386; F02K 1/48
See application file for complete search history.

(56) References Cited

U.S. PATENT DOCUMENTS 2,798,661 A * 7/1957 Willenbrock, Jr. ........ F02C 7/04
415/209.1
3,084,505 A * 4/1963 Cherchi .................... F02K 1/48
239/265.11
3,084,507 A * 4/1963 Kleinhans et al. ... B64C 25/423
239/265.17

(Continued)

FOREIGN PATENT DOCUMENTS

EP 2587037 5/2013

OTHER PUBLICATIONS

D. C. McCormick, and J. C. Bennett Jr., Vortical and Turbulent Structure of a Lobed Mixer Free Shear Layer, AIAA Journal vol. 32, No. 9, Sep. 1994, pp. 1852-1859. (Year: 1994).*

(Continued)

Primary Examiner — Gerald L Sung
Assistant Examiner — Marc J Amar
(74) Attorney, Agent, or Firm — Carlson, Gaskey & Olds, P.C.

(57) ABSTRACT

An exhaust nozzle for a turbine engine includes multiple daisy style corrugations arranged circumferentially about the exhaust nozzle. Each of the daisy style corrugations has a radially inner base portion and multiple lobes protruding radially outward from the base portion.

18 Claims, 5 Drawing Sheets

(56) References Cited

U.S. PATENT DOCUMENTS

| | | | |
|---|---|---|---|
| 3,249,306 A | 5/1966 | Altseimer | |
| 3,568,792 A | 3/1971 | Urquhart | |
| 3,678,690 A * | 7/1972 | Shohet | F02C 3/10 |
| | | | 60/226.3 |
| 3,710,890 A * | 1/1973 | True | F02K 1/36 |
| | | | 181/215 |
| 3,927,522 A * | 12/1975 | Bryce | F02K 1/38 |
| | | | 60/264 |
| 3,946,554 A * | 3/1976 | Neumann | F02C 9/20 |
| | | | 60/204 |
| 4,066,214 A * | 1/1978 | Johnson | B64D 33/04 |
| | | | 239/265.19 |
| 4,078,576 A * | 3/1978 | Punch | B01F 3/02 |
| | | | 137/606 |
| 4,149,375 A * | 4/1979 | Wynosky | F02K 1/386 |
| | | | 60/262 |
| 4,165,609 A * | 8/1979 | Rudolph | F02K 1/386 |
| | | | 181/213 |
| 4,302,934 A | 12/1981 | Wynosky et al. | |
| 4,401,269 A * | 8/1983 | Eiler | B64C 11/48 |
| | | | 60/204 |
| 4,487,017 A | 12/1984 | Rodgers | |
| 4,543,784 A * | 10/1985 | Kirker | F02K 1/386 |
| | | | 181/213 |
| 4,571,936 A * | 2/1986 | Nash | B64D 33/04 |
| | | | 181/215 |
| 4,592,201 A * | 6/1986 | Dusa | B64D 33/04 |
| | | | 181/213 |
| 4,686,826 A * | 8/1987 | Koshoffer | F02K 1/386 |
| | | | 60/262 |
| 4,754,924 A * | 7/1988 | Shannon | B64D 33/04 |
| | | | 181/215 |
| 4,813,230 A * | 3/1989 | Braithwaite | F02K 1/38 |
| | | | 60/264 |
| 4,836,469 A * | 6/1989 | Wagenfeld | B64D 33/04 |
| | | | 181/213 |
| 4,936,748 A * | 6/1990 | Adamson | F02C 6/206 |
| | | | 416/123 |
| 4,951,461 A * | 8/1990 | Butler | F02C 3/067 |
| | | | 415/65 |
| 5,076,053 A * | 12/1991 | McVey | F23R 3/18 |
| | | | 60/749 |
| 5,103,635 A * | 4/1992 | Lardellier | F02C 3/067 |
| | | | 415/79 |
| 5,638,675 A * | 6/1997 | Zysman | F02K 1/386 |
| | | | 181/213 |
| 5,692,372 A * | 12/1997 | Whurr | F01C 1/22 |
| | | | 60/226.1 |
| 5,992,140 A * | 11/1999 | Hammond | H01J 37/32449 |
| 6,082,967 A * | 7/2000 | Loisy | F02C 7/36 |
| | | | 415/68 |
| 6,124,031 A * | 9/2000 | Yoshida | C08J 5/18 |
| | | | 428/329 |
| 6,301,877 B1 | 10/2001 | Liang et al. | |
| 6,578,355 B1 | 6/2003 | Mundt | |
| 7,966,824 B2 | 7/2011 | Mengle | |
| 8,087,250 B2 | 1/2012 | Gutmark et al. | |
| 9,970,386 B2 * | 5/2018 | Ribarov | F02K 1/386 |
| 2004/0006968 A1 * | 1/2004 | Oishi | F02K 1/386 |
| | | | 60/262 |
| 2004/0088967 A1 * | 5/2004 | Webster | F02K 1/34 |
| | | | 60/204 |
| 2005/0034444 A1 * | 2/2005 | Sanders | F23N 1/022 |
| | | | 60/39.23 |
| 2005/0193716 A1 * | 9/2005 | Schlinker | F02K 1/34 |
| | | | 60/204 |
| 2006/0112675 A1 * | 6/2006 | Anderson | F02K 1/386 |
| | | | 60/262 |
| 2007/0000234 A1 * | 1/2007 | Anderson | F02K 1/04 |
| | | | 60/262 |
| 2007/0028622 A1 * | 2/2007 | Steyer | F02K 1/48 |
| | | | 60/772 |
| 2008/0175703 A1 * | 7/2008 | Lugg | B01F 3/02 |
| | | | 137/606 |
| 2008/0253881 A1 * | 10/2008 | Richards | F02C 7/052 |
| | | | 415/145 |
| 2009/0324093 A1 * | 12/2009 | Miarecki | G06K 9/42 |
| | | | 382/203 |
| 2011/0056183 A1 * | 3/2011 | Sankrithi | B64C 11/48 |
| | | | 60/204 |
| 2013/0104555 A1 * | 5/2013 | Dindar | F02K 1/48 |
| | | | 60/770 |
| 2015/0291285 A1 * | 10/2015 | Gallet | F01D 13/02 |
| | | | 415/60 |
| 2015/0330866 A1 * | 11/2015 | Yang | G01M 11/081 |
| | | | 73/112.02 |
| 2015/0337761 A1 * | 11/2015 | Marini | F01D 9/041 |
| | | | 415/144 |
| 2016/0258297 A1 * | 9/2016 | Cortequisse | F04D 29/023 |
| 2016/0305663 A1 * | 10/2016 | Lebel | F23R 3/002 |
| 2016/0329193 A1 * | 11/2016 | Sieber | H01J 37/32449 |
| 2019/0264800 A1 * | 8/2019 | Fisher | F16H 57/0435 |

OTHER PUBLICATIONS

A. Waitz, Y. J. Qiu, T. A. Manning, A. K. S. Fung, J. K. Elliot, J. M. Kerwin, J. K. Krasnodebski, M. N. O'Sullivan, D. E. Tew, E. M. Greitzer, F. E. Marble, C. S. Tan and T. G. Tillman, Enhanced Mixing With Streamwise Vorticity, Prog. Aerospace Sci. vol. 33, pp. 323-351. (Year: 1997).*

* cited by examiner

EXHAUST STREAM MIXER

CROSS-REFERENCE TO RELATED APPLICATIONS

This application claims priority to U.S. Provisional Application No. 61/832,198, which was filed on Jun. 7, 2013, and to U.S. patent application Ser. No. 14/298,331 each of which are incorporated herein by reference.

TECHNICAL FIELD

The present disclosure is related toward a corrugated exhaust nozzle for a gas turbine engine, and more specifically toward an exhaust nozzle incorporating multiple daisy style corrugations.

BACKGROUND OF THE INVENTION

Gas turbine engines, such as those used to drive propellers in a contra-rotating prop-fan engine, utilize compressed and expanded gasses to produce rotational motion. Such engines include a compressor section, a combustor section, and a turbine section which work cooperatively to drive a shaft. A gas flowpath passes through each of the compressor, combustor and turbine sections and fluidly connects them. Also connected to the shaft, aft of the turbine section, are multiple propellers which generate thrust.

Heated exhaust gasses from the turbine section of the gas turbine engine contact the roots of the propeller blades after being expelled from the turbine section. If the exhaust gasses do not have sufficient time to cool by mixing with ambient air prior to the gasses contacting the propeller blades, the excess heat of the gasses can wear the propeller blades significantly reducing the propeller blade life and possibly damaging the propeller blades.

In order to mitigate this effect, the prior art has relied on applying costly thermal barrier coatings to the affected areas of the blades to prevent damage from the hot exhaust gasses. Such methods are undesirable in some engines as they require periodic checks and periodic maintenance of any damaged thermal barrier coatings. Thermal barrier coating systems also include a potential risk of in-flight thermal barrier coating damage which can lead to damage to the propeller blades and affect the available thrust.

SUMMARY OF THE INVENTION

A turbine engine according to an exemplary embodiment of this disclosure, among other possible things includes a compressor section, a combustor in fluid communication with the compressor section, a turbine section in fluid communication with the combustor, an exhaust nozzle in fluid communication with the turbine section, the exhaust nozzle includes a plurality of exhaust stream mixers circumferentially disposed about the exhaust nozzle, each of the exhaust stream mixers includes a radially inward base portion and a plurality lobes protruding radially outward from the base portion.

In a further embodiment of the foregoing turbine engine, each of the exhaust stream mixers is defined by a single continuously curved wall.

In a further embodiment of the foregoing turbine engine, each of the exhaust stream mixers is further defined by a cross section normal to an axis defined by the turbine engine, the cross section has a circumferential length at least twice the circumferential length of a circle inscribing the exhaust stream mixer.

In a further embodiment of the foregoing turbine engine, each of the base portions is defined by a pair of convex walls.

In a further embodiment, the foregoing turbine engine further includes at least four exhaust stream mixers.

In a further embodiment, the foregoing turbine engine further includes at least 8 exhaust stream mixers.

In a further embodiment of the foregoing turbine engine, each of the exhaust stream mixers has a radial height less than one half the total radius of the exhaust nozzle.

In a further embodiment of the foregoing turbine engine, each of the exhaust stream mixers has a radial height of less than one quarter the total radius of the exhaust nozzle.

In a further embodiment of the foregoing turbine engine, each of the exhaust stream mixers is defined by at least three radially protruding lobes and a valley between each of the radially protruding lobes and each adjacent of the radially protruding lobes.

In a further embodiment of the foregoing turbine engine, each of the lobes has a smaller cross sectional area than the base portion.

A method for mixing exhaust gas exiting an exhaust nozzle of a turbine engine according to an exemplary embodiment of this disclosure, among other possible things includes passing exhaust gasses through an exhaust stream mixer, the exhaust stream mixer includes at least one daisy style corrugation, thereby generating stream-wise vortices and transverse vortices in the exhaust stream.

In a further embodiment of the foregoing method, the step of passing the exhaust gasses through an exhaust stream mixer includes passing the gas through an exhaust stream mixer defined by at least a base portion having two convex walls and a plurality of lobes extending radially outward from the base portion, thereby maximizing a circumference of the exhaust nozzle while maintaining a desired cross sectional area.

In a further embodiment of the foregoing method, the step of passing the exhaust gasses through the exhaust stream mixer further includes maturing the vortices until the vortices are of sufficient size that each of the vortices interfaces with adjacent vortices.

In a further embodiment of the foregoing method, the stream-wise vortices and the transverse vortices facilitate intermixing between the exhaust gasses and a surrounding ambient air flow.

In a further embodiment of the foregoing method, the intermixing between the exhaust gasses and the surrounding ambient air flow cools the exhaust gasses prior to the exhaust gasses contacting a propeller blade, thereby protecting the propeller blade from thermal stresses.

An exhaust nozzle according to an exemplary embodiment of this disclosure, among other possible things includes an axis defined by the exhaust nozzle, a cross section of the exhaust nozzle normal to the axis includes a plurality of daisy style corrugations, each of the daisy style corrugations further comprises a radially inner base portion, and a plurality of lobes protruding radially outward from said base portion.

In a further embodiment of the foregoing exhaust nozzle, each of the daisy style corrugations is defined by a plurality of convex sidewalls.

In a further embodiment of the foregoing exhaust nozzle, each of the plurality of lobes has a smaller cross sectional area than the base section.

In a further embodiment of the foregoing exhaust nozzle, the daisy style corrugation is constructed of a single continuous wall.

These and other features of the present invention can be best understood from the following specification and drawings, the following of which is a brief description.

BRIEF DESCRIPTION OF THE DRAWINGS

FIG. 4b illustrates an isometric view of the exhaust nozzle of FIG. 3a.

DETAILED DESCRIPTION OF AN EMBODIMENT

Figure 1:
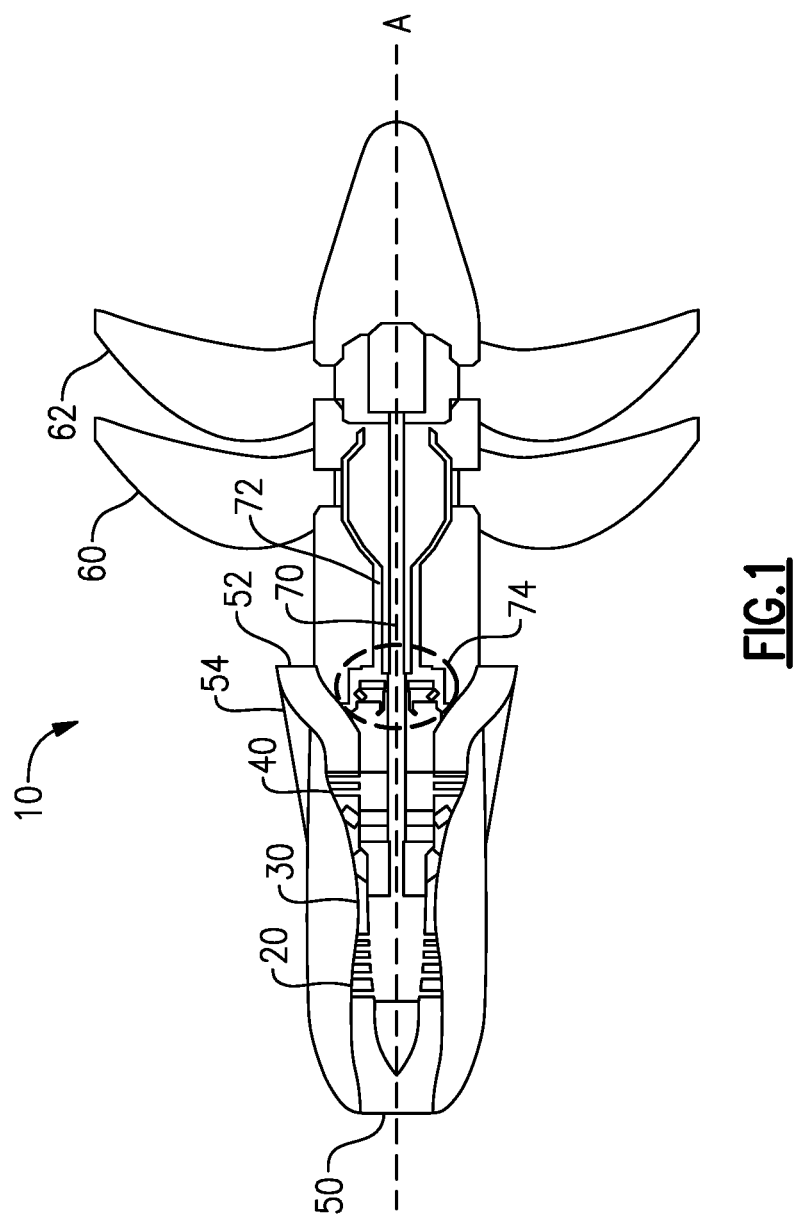
FIG. 1 schematically illustrates a contra-rotating prop-fan engine.

FIG. 1 illustrates a contra-rotating prop-fan engine 10 used to generate thrust for an aircraft. The engine 10 includes a compressor section 20, a combustor section 30, and a turbine section 40. The compressor section 20, combustor section 30, and the turbine section 40 work cooperatively to rotationally drive a shaft 70 along the engine's central axis A. A gas path fluidly connects each of the compressor section 20, combustor section 30, and the turbine section 40. Gas, such as ambient air, is admitted into the gas path at a gas inlet 50 on a fore end of the contra-rotating prop-fan engine 10. Heated exhaust gas is expelled from the turbine engine section 40 out a nozzle 52 located in an exhaust nozzle section 54 of the engine 10. Connected to the concentric, contra-rotating shafts 72 and 70, and aft of the exhaust nozzle section 54, are a pair of contra-rotating propellers 60, 62, respectively, that generate thrust for the aircraft. The contra-rotating propeller 60 is mounted on a separate shaft 72. The separate shaft 72 is concentric to the input shaft 70 and rotates in a direction opposite to the rotation of shaft 70 through a compact differential gearbox 74.

The heated exhaust gases from the turbine section 40 are expelled directly in front of (fore of) a radially inner portion of the leading edge of the blades of the contra-rotating propellers 60, 62. These hot exhaust gases can reach temperatures as high as 950 F (510 C) during operation of the engine 10. Due to the high energy momentum of the exhaust gases, the exhaust gasses do not mix well with the ambient air flow surrounding the engine 10. If the exhaust gasses are not cooled below a certain threshold, the exhaust gasses affect the structural integrity of the blades of the propellers 60, 62. Further exacerbating this effect is the fact that in order to save weight and cost, the blades of the contra-rotating propellers 60, 62 are often manufactured from epoxy resins, fiberglass, or other lightweight composite materials and are unable to withstand high thermal stresses.

The mixing of the exhaust gases from the turbine section 40 with the ambient air flow causes jet exhaust noise. The exhaust noise is further increased by a shearing action caused by the disparity between the relative speeds between the exhaust gasses and the ambient air flow. Jet exhaust noise levels are undesirable and can be reduced by increasing the mixing rate between the exhaust gasses and the ambient air flow, or when the exhaust gas velocity relative to the velocity of surrounding cold air flow is reduced. This effect is achieved by changing the pattern of the exhaust jet emanating from the exhaust nozzle 52. One way of changing the pattern of the exhaust gas jet is by including exhaust stream mixers, such as corrugations, at the exhaust nozzle 52. In addition to noise mitigation, corrugated exhaust nozzles 52 allow more efficient hot gas/cold ambient air mixing which improves the overall efficiency of the engine 10 and lowers the temperature of the exhaust gas stream.

Figure 2:
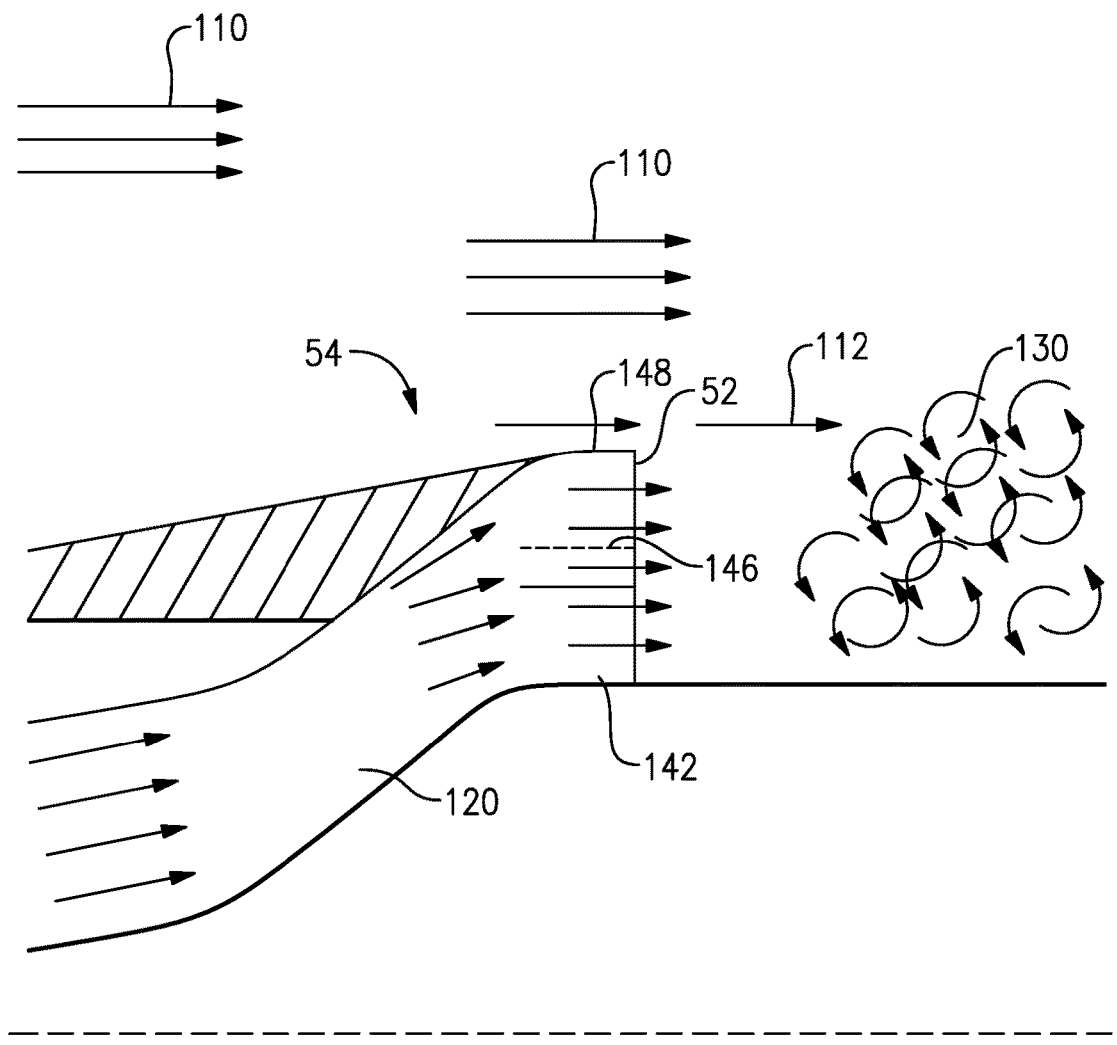
FIG. 2 schematically illustrates an exhaust nozzle section of the contra-rotating prop-fan engine of FIG. 1.

FIG. 2 illustrates a zoomed-in exhaust nozzle section 54 of the contra-rotating prop-fan engine 10 of FIG. 1 including the above described corrugations. A gas path 120 proceeds from the turbine section 40, illustrated in FIG. 1, and funnels the exhaust gasses to an exhaust nozzle 52 that expels the gasses out of the engine 10. Ambient air 110 surrounds the engine 10, and is at a lower temperature relative to the exhaust gasses. Due to the speeds and temperatures of the exhaust gasses, relative to the ambient air 110, a boundary layer 112 separates the ambient air 110 from the exhaust gasses.

The exhaust nozzle 52 is shaped with multiple deep daisy style corrugations that function as efficient exhaust stream mixers. Each of the daisy style corrugations is defined by multiple lobes defining peaks 148, valleys 146, and a base portion 142. The particular shaping of the daisy style corrugations imparts both an axial swirl and a circumferential swirl on the exhaust gasses emanating from the gas path 120. The specifics of the swirling are discussed in greater detail below. The swirling aids in breaking down the boundary layer 112, resulting in a swirling mixture 130 of the exhaust gasses and the ambient air 110. The swirling mixture 130, in turn, cools the exhaust gasses prior to the exhaust gasses contacting the propeller blades 60, 62, thereby minimizing wear on the blades.

Daisy style corrugations provide a large ratio of circumference area to cross sectional area of the nozzle 52. In some instances, the daisy style corrugations are limited by performance penalties that restrict the depth of each corrugation, the number of corrugations, or the number of lobes in each corrugation. In order to prevent backpressure and other penalties, the daisy style corrugated nozzle 52 maintains the same cross sectional area as known basic ring shaped nozzles of the prior art.

Figure 3:
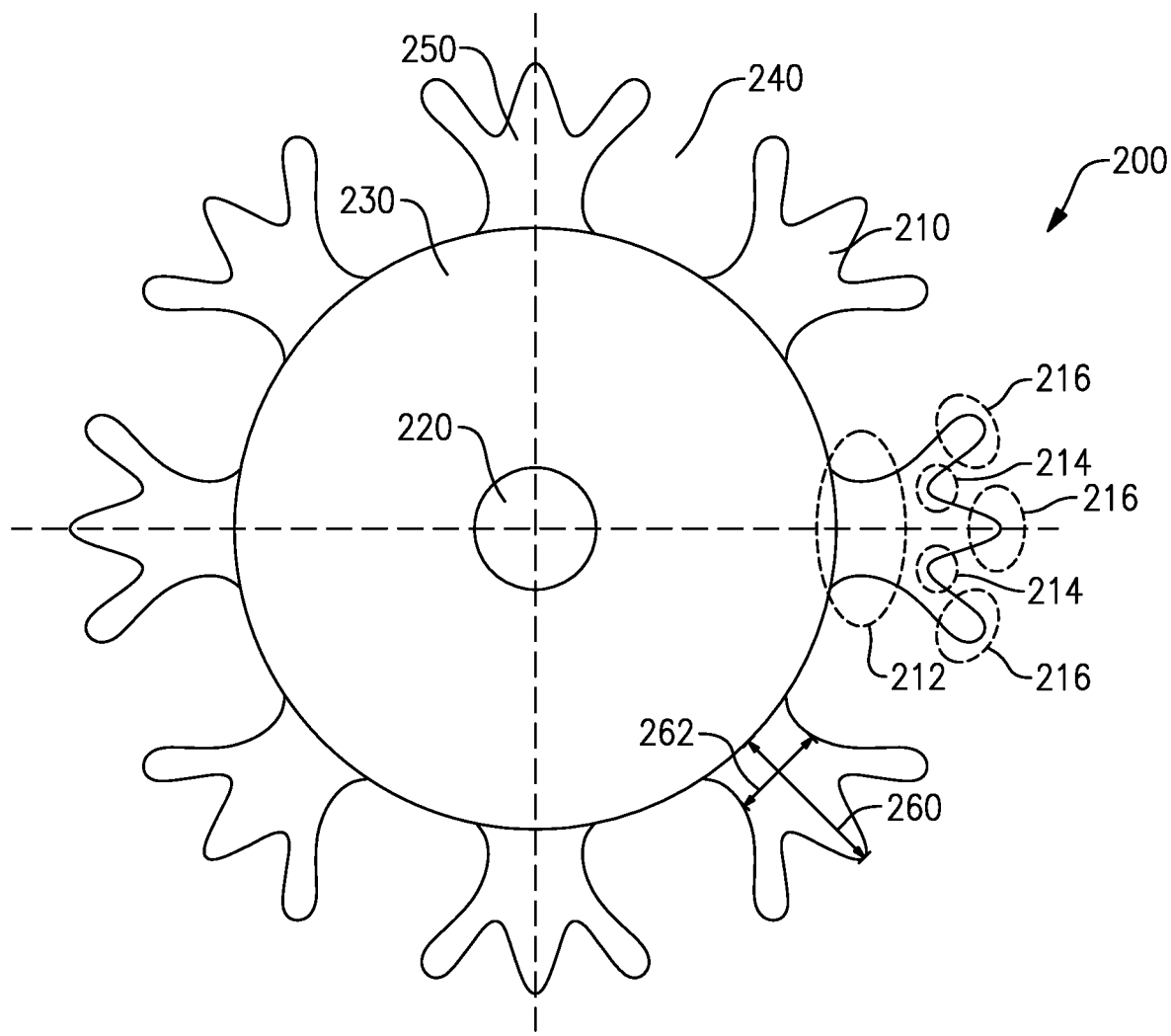
FIG. 3 illustrates a cross sectional aft view of the exhaust nozzle of the contra-rotating prop-fan engine of FIG. 1.

FIG. 3 schematically illustrates an aft cross sectional view of the nozzle 52 of FIG. 2 and provides a cross sectional view of the daisy style corrugations 210 of the exhaust nozzle 52. The engine 200 includes a shaft 220 and a turbine section 230 defined about the shaft. Arranged circumferentially about the turbine section 230 are the multiple daisy style corrugations 210 through which exhaust gasses are emitted from the turbine section 230. In the particular illustrated example, eight daisy style corrugations 210 are utilized. It is understood that the particular number of daisy style corrugations 210 utilized can be altered depending on the specifications of the particular engine 200. Each of the daisy style corrugations 210 defines an exhaust gas opening 250 that expels exhaust gas from the exhaust nozzle 52 into the ambient air flow 240 surrounding the engine 200.

Daisy style corrugations 210 are defined by a relatively wide base portion 212 having convex walls and multiple lobes 216 (alternately referred to as petals) extending radially outward from the base section 212. A base section width 262 is defined as the shortest distance across the base section 212. A radial height 260 of each daisy style corrugation 210 is defined as the distance that the daisy style extends radially outward from the turbine section 230. Defined between each lobe 216 and each adjacent lobe 216 in a single daisy style corrugation 210 is a valley 214. In contrast, prior art corrugations are defined by a single peak/valley per corrugation or a wave shaped pattern. As described above, the introduction of the lobed daisy style corrugations 210 as exhaust stream mixers increases the mixing between the exhaust gasses and the ambient air 240 in a turbulent jet in a number of ways.

First, the convolution of the lobes 216 increases the initial interface area between primary and secondary flows relative to prior art corrugations and ring nozzles. The combination of lobes 216 and valleys 214 imparts an axial swirl (aligned with the shaft 220) on the exhaust gasses. The axial swirls are alternately referred to as streamwise vortices, and a circumferential swirl (tangential to the circumference of the engine 200) on the exhaust gasses, the circumferential swirls are alternately referred to as transverse vortices, on the exhaust gasses exiting the nozzle. The tangential swirls aid in breaking down the boundary layer 112 (illustrated in FIG. 2). The tangential swirls also increase the rate at which the exhaust gasses mix with the ambient air 240.

A second way that the daisy style corrugations increase mixing drives from the stream-wise vortices. The streamwise vortices increase the interface area between the exhaust gasses and the ambient air 240 due to an interaction between counter rotating vortices. A cross stream convection associated with the stream-wise vortices increases the interface gradients between the ambient air and the exhaust gasses thereby further increasing the mixing.

Furthermore, by imparting the streamwise and transverse vortices on the exhaust gas, the instability of the boundary layer 112 between the exhaust gas and the ambient air is increased (causing the boundary layer 112 to break down faster) and the mixing rate is increased. Horseshoe vortices can also be generated in the exhaust stream as a result of the daisy style corrugations 210; however, their impact on the overall mixing between the exhaust gasses from the nozzle 52 and the ambient air 240 is minimal compared to the effects from the streamwise and transverse vortices.

Figure 4A:
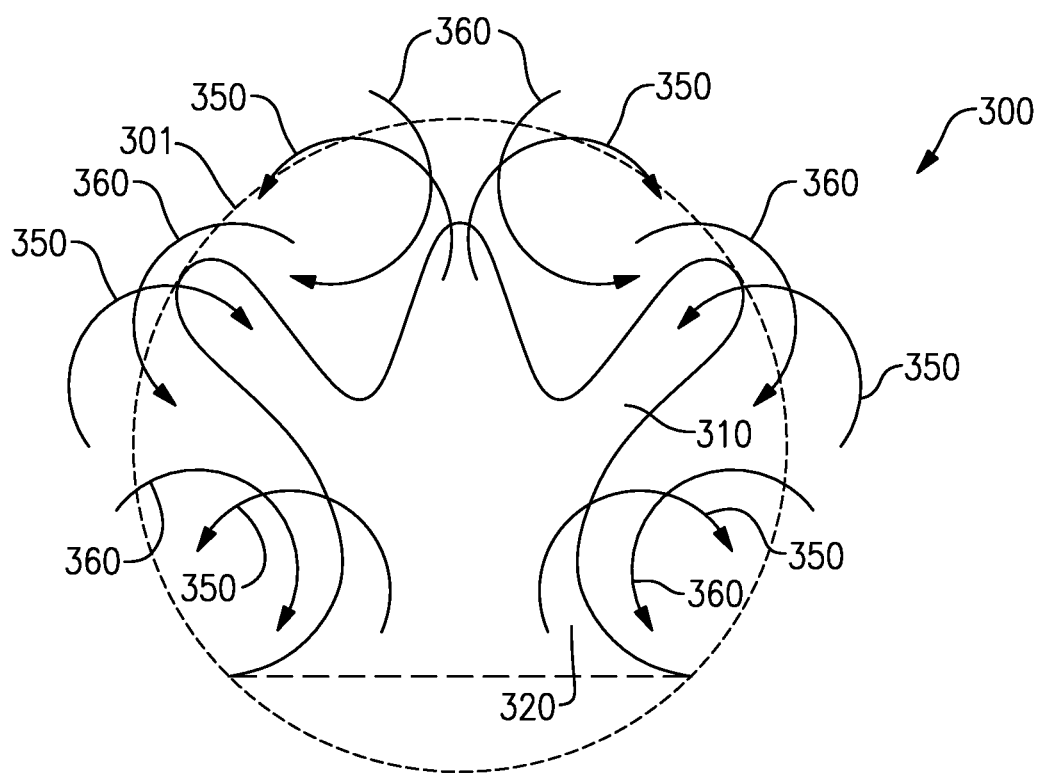
FIG. 4a illustrates a cross section of an example daisy style corrugation for use in an exhaust nozzle.
Figure 4B:
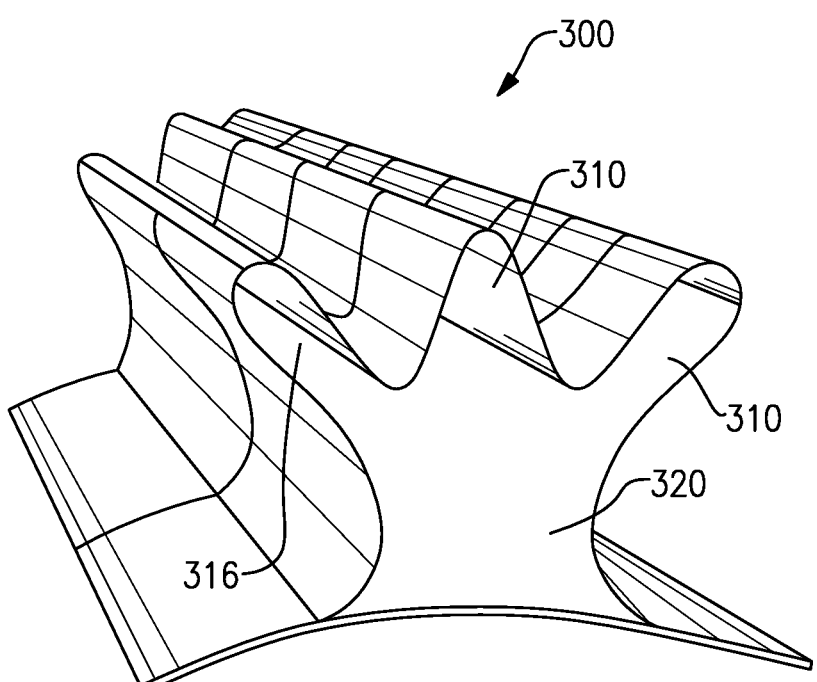

FIG. 4a illustrates an example daisy style corrugation exhaust stream mixer 300 for use in a nozzle 52. FIG. 4b illustrates an isometric view of the daisy style corrugation exhaust stream mixer 300. In addition to the enhancement to the mixing processes provided by the daisy style corrugations (described above), the introduction of the stream-wise vortices resulting from the daisy style corrugations substantially alters the flow field as compared to prior art corrugations (defined by alternating peaks, and valleys arranged circumferentially around the nozzle). In daisy style corrugation, each lobe 310 produces a pair of counter rotating vortices 350, 360 in the exhaust stream. The vortices 350, 360 increase in size as they travel away from the nozzle 52. This increase in size is referred to as maturing. As the vortices mature, they effectively twist the hot exhaust gas flow from the nozzle 52 and the cold bypass flow from the ambient air together in a helical manner. As the vortices move downstream from the nozzle, they grow due to turbulent diffusion and thermal dissipation and begin to interact with the vortices produced by the adjacent lobe, thereby further increasing the mixing rate.

The daisy style corrugation exhaust stream mixer 300 also provides a larger circumference of the exhaust nozzle relative to a ring nozzle or standard corrugation without increasing the cross sectional area. The circumference of the exhaust nozzle in a ring nozzle is $C_n = \pi D_n$, where $C_n$ is the circumference of the exhaust nozzle and $D_n$ is the diameter of the exhaust nozzle. Inclusion of daisy style corrugations such as is illustrated in FIGS. 3 and 4 provide 8-9 times the circumferential length for the same overall nozzle diameter. By way of explanation, the overall nozzled diameter of the daisy style corrugated nozzle is the diameter of a circle that would circumscribe the daisy corrugated nozzle, and the overall nozzle diameter of a non-corrugated nozzle is the diameter of the nozzle. Similarly, the overall diameter of a nozzle including standard wave corrugations is the diameter of a circle circumscribing the wave corrugations.

A typical daisy style corrugation's circumference is approximately twice the circumference of the circle in which the corrugation can be inscribed. Hence, to increase the overall circumference of a nozzle 52 by a factor of eight, four daisy style corrugations are used. The daisy style corrugations provide the added benefit of reducing the overall diameter of the nozzle 52. In one example, we use eight daisy style corrugations, for an exhaust nozzle 52 with a diameter of 300 mm; the required average height of each lobed mixer is ¼ of the overall diameter of nozzle 52, 75 mm. Further increasing the number of the daisy style corrugations leads to even smaller requirements for individual mixer heights. The optimal design is dictated by the specific engine parameters, including cost, for a specific installation.

The increased surface area of the daisy-style exhaust nozzle, relative to existing ring nozzles or known corrugated nozzles having the same cross sectional area allows for significant improvements in cooling. In one example the heated exhaust gasses can be cooled to around 450 F (230 C) using the daisy style corrugations. This low temperature allows the propeller blades to be created of lower heat tolerant materials, such as phenolic-composite resin, without the need for turbine blade coatings or active cooling.

Figure 5:
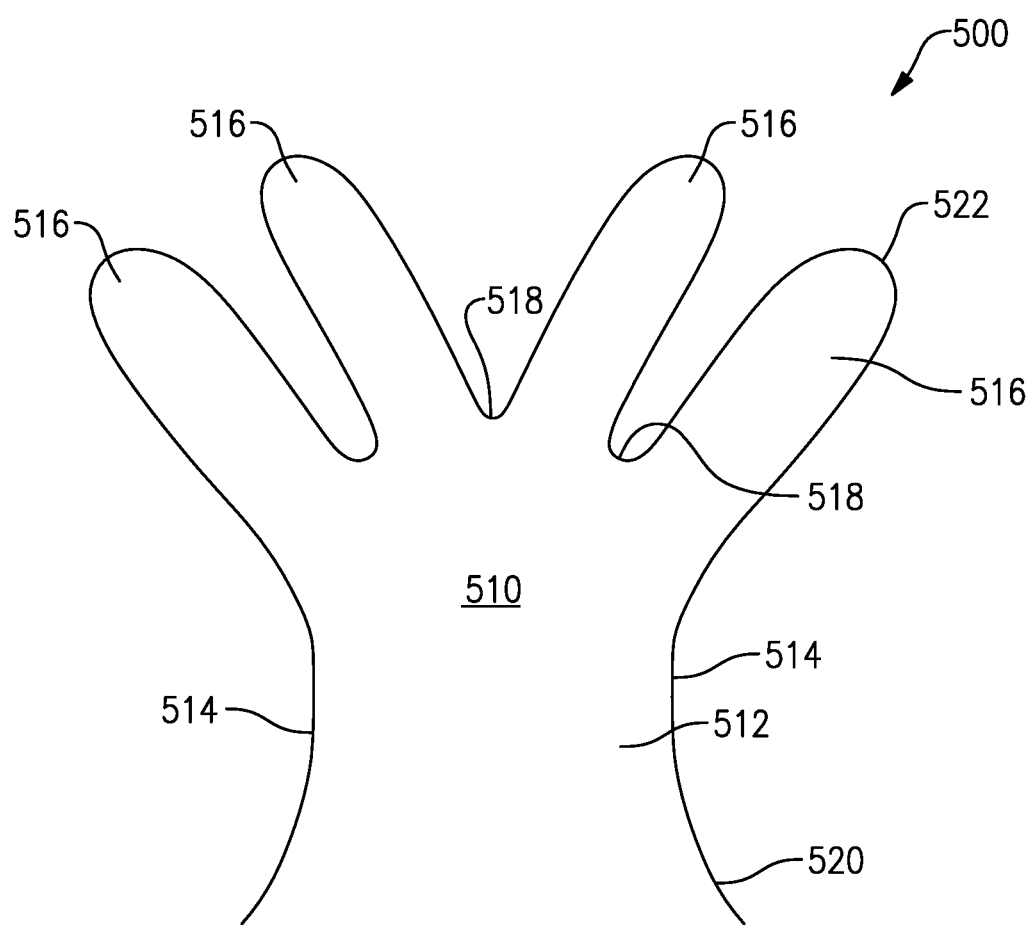
FIG. 5 illustrates a cross section of an alternate example daisy style corrugation for use in an exhaust nozzle.

Referring now to FIG. 5, an alternate daisy style corrugated exhaust mixer 500 is illustrated. As can be seen, each of the daisy style corrugations 510 is defined by a wide based portion 512 having convex sidewalls 514. Protruding radially outward from the wide base portion 512 are multiple lobes 516 (peaks) defining a valley 518 between each lobe 516 and each adjacent lobe 516.

As can be seen the number of lobes 516 can be increased beyond three, with a corresponding increase in the circumference of the daisy style corrugation 500. To compensate for the decrease in lobe 516 cross-sectional area resulting from an increase in the number of lobes 516, the base section is enlarged, thereby maintaining a consistent exhaust nozzle cross sectional area and preventing excessive back pressure at an exhaust nozzle.

Further defining daisy style corrugations 500 is the continuous nature of the walls 520, 522 defining the base portion 512 and the lobes 516. The walls 520, 522 are continuous in order to prevent corners or grooves which act as stress risers, and where debris (i.e., dust, sand, soot, dirt, grime, etc.) can build up.

As can be appreciated by one of skill in the art having the benefit of this disclosure, the particular lengths, widths and numbers of the proposed daisy-style lobes can be selected to tailor the above described affects to a particular engine or configuration while still falling within the above disclosure.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for mixing exhaust gas exiting an exhaust nozzle of a turbine engine comprising the step of:
    passing exhaust gasses through at least one exhaust stream mixer of a plurality of exhaust stream mixers thereby generating stream-wise vortices and transverse vortices in said exhaust stream, wherein said at least one exhaust stream mixer comprises a daisy style corrugation, the at least one exhaust stream mixer is defined by a cross section normal to an axis defined by the turbine engine, wherein the cross section has a length extending the entire circumference of the cross section at least twice an entire length of a circumference of a circle circumscribing the cross section normal to the axis of the turbine engine.

2. The method of claim 1, wherein said step of passing said exhaust gasses through the at least one exhaust stream mixer, comprises passing said gas through the at least one exhaust stream mixer defined by at least a base portion having two convex walls and a plurality of lobes extending radially outward from said base portion.

3. The method of claim 1, wherein the step of passing said exhaust gasses through said at least one exhaust stream mixer further comprises maturing vortices until said vortices are of sufficient size that each of said vortices interfaces with adjacent vortices.

4. The method of claim 1, wherein said stream-wise vortices and said transverse vortices facilitate intermixing between said exhaust gasses and a surrounding ambient air flow.

5. The method of claim 4, wherein said intermixing between said exhaust gasses and said surrounding ambient air flow cools said exhaust gasses prior to said exhaust gasses contacting a propeller blade, thereby protecting said propeller blade from thermal stresses.

6. A turbine engine comprising:
    a compressor section;
    a combustor in fluid communication with the compressor section;
    a turbine section in fluid communication with the combustor,
    an exhaust nozzle in fluid communication with the turbine section;
    said exhaust nozzle comprising a plurality of exhaust stream mixers circumferentially disposed about said exhaust nozzle, wherein each of said exhaust stream mixers includes a radially inward base portion and a plurality lobes protruding radially outward from said base portion, and the exhaust stream mixer is defined by a cross section normal to an axis defined by the turbine engine, wherein the cross section has a length extending the entire circumference of the cross section at least twice an entire length of a circumference of a circle circumscribing the cross section normal to the axis of the corresponding stream mixer of each of said plurality of exhaust stream mixers.

7. The turbine engine of claim 6, wherein each of said exhaust stream mixers is defined by a single continuously curved wall.

8. The turbine engine of claim 6, wherein each of said base portions is defined by a pair of convex walls.

9. The turbine engine of claim 6, wherein further comprising at least four exhaust stream mixers.

10. The turbine engine of claim 9, further comprising at least 8 exhaust stream mixers.

11. The turbine engine of claim 6, wherein each of said exhaust stream mixers has a radial height less than one half the total radius of the exhaust nozzle.

12. The turbine engine of claim 11, wherein each of said exhaust stream mixers has a radial height of less than one quarter the total radius of the exhaust nozzle.

13. The turbine engine of claim 6, wherein each of said exhaust stream mixers is defined by at least three radially protruding lobes and a valley between each of said radially protruding lobes and each adjacent of said radially protruding lobes.

14. The turbine engine of claim 6, wherein each of said lobes has a smaller cross sectional area than said base portion.

15. An exhaust nozzle comprising:
    an axis defined by the exhaust nozzle, wherein a cross section of the exhaust nozzle normal to said axis includes a plurality of daisy style corrugations;
    each of said daisy style corrugations further comprises a radially inner base portion, and a plurality of lobes protruding radially outward from said base portion; and
    each of said daisy style corrugations is defined by a cross section normal to an axis defined by a turbine engine, wherein the cross section has a length extending the entire circumference of the cross section at least twice an entire length along a circumference of a circle circumscribing the cross section normal to the axis of the corresponding stream mixer of each of said plurality of exhaust stream mixers.

16. The exhaust nozzle of claim 15, wherein each of said daisy style corrugations is defined by a plurality of convex sidewalls.

17. The exhaust nozzle of claim 16, wherein each of said plurality of lobes has a smaller cross sectional area than said base section.

18. The exhaust nozzle of claim 16, wherein said daisy style corrugation is constructed of a single continuous wall.

* * * * *